July 22, 1969  R. GENÄHR  3,457,000
TERMINAL ASSEMBLY FOR LIGHT-CONDUCTING CABLE
Filed Aug. 4, 1965
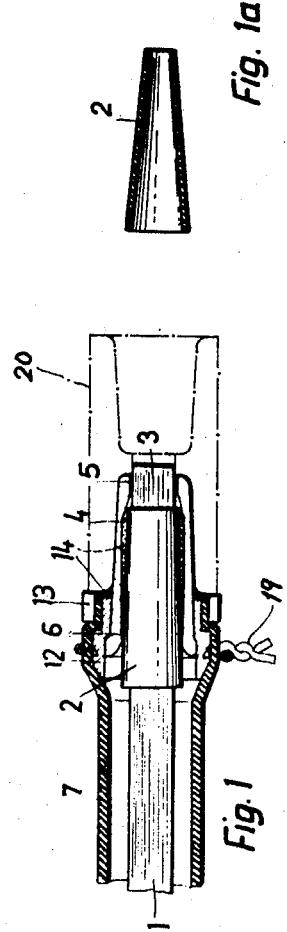
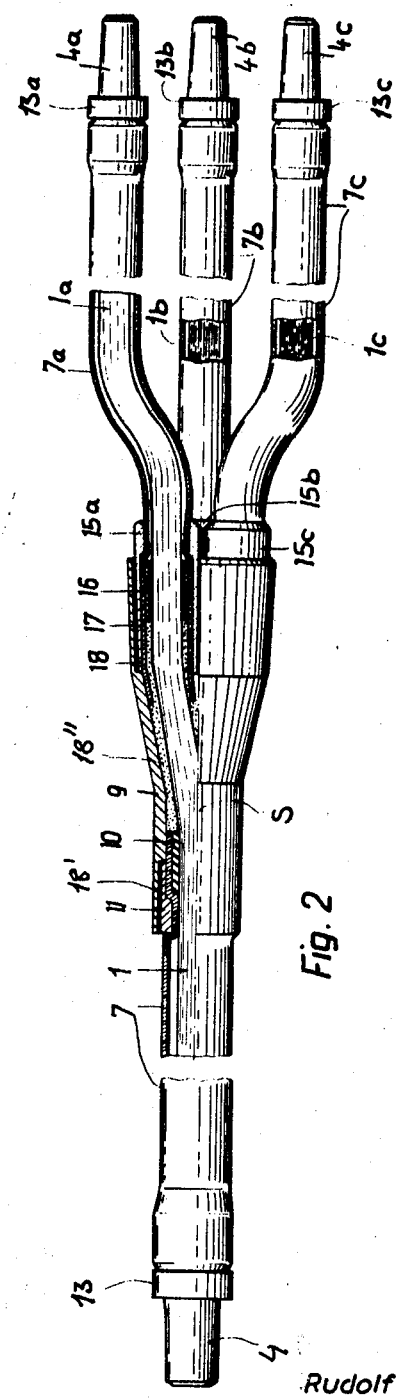
Rudolf Genähr
Inventor
BY Karl F. Ross
Attorney

United States Patent Office 3,457,000
Patented July 22, 1969

3,457,000
TERMINAL ASSEMBLY FOR LIGHT-CONDUCTING CABLE
Rudolf Genähr, Bad Kreuznach, Rhineland, Germany, assignor to Jos. Schneider & Co., Optische Werke, Bad Kreuznach, Rhineland, Germany, a corporation of Germany
Filed Aug. 4, 1965, Ser. No. 477,220
Claims priority, application Germany, Aug. 10, 1964, Sch 35,603
Int. Cl. G02b 5/14
U.S. Cl. 350—96    6 Claims

ABSTRACT OF THE DISCLOSURE

A terminal portion of a light-conducting cable is clamped by a resilient sleeve under stress which lets the extremities of the cable strands project from an end thereof and which in its unstressed state converges toward that end, the sleeve being embraced by a rigid nipple which partly bears upon the projecting extremities of the strands in adhesive contact therewith and which at its other end serves as an anchorage for a sheath surrounding the strands.

---

My present invention relates to a light-conducting cable of the type used to convey messages, e.g., in the form of luminous pulses, to a multiplicity of receivers therefor by "piping" light rays through a bundle of strands of light-transmissive material such as, for example, polyacrylate resin.

The general object of the invention is to provide means in such cables for conveniently coupling the bundled strands thereof to other components, e.g., to associated light sources for two similar cables.

A more particular object of this invention is to provide coupling means of this type designed to afford a dependable connection while avoiding the risk of breakage of the relatively fragile strands.

It is also an object of the invention to provide means in such cable for facilitating the splitting of a bundle of strands into several branches, again with substantial elimination of the risk of filament rupture.

In accordance with an important feature of the invention I provide a two-part fitting around a selected portion of a bundle of light-conducting strands or filaments, this fitting comprising an inner annular element holding the strands together and an outer annular element adapted to serve, either alone or in conjunction with the inner element, as an anchorage for a flexible sheath enveloping the bundled strands.

According to a more specific feature of the invention, the inner annular element is a resilient sleeve of smaller diameter than the associated bundle so as to engage the same under stress. Particularly where a terminal portion of the bundle is engaged by the sleeve, the latter is advantageously given a slight conicity so as to converge toward its outer end, i.e., toward the end closer to the free extremity of this terminal portion which, according to a still further feature of the invention, projects beyond the sleeve and is engaged by a constricted part of the surrounding, relatively rigid outer annular element to which it is adhesively secured. The adhesive used for this purpose, preferably a cold-setting epoxy resin such as the one commercially available under the name "Araldite," advantageously is also allowed to penetrate into the spaces between the strands so as to bond them together.

A basically similar arrangement may be provided, in accordance with yet another feature of the invention, at a separation point where a bundle of strands divides into several branches. In this instance a two-part fitting of the character described, in engagement with a first sheath enveloping the entire bundle, may be disposed ahead of the separation point whereas a plurality of similar fittings are respectively provided on each branch beyond that point to serve as anchorages for corresponding second sheaths individually enveloping the several branches. An outer shell surrounding the separation point may then be adhesively secured to the outer annular elements of the several fittings in order to hold them in place.

The invention will be described in greater detail with reference to the accompanying drawing in which:

FIG. 1 is a longitudinal sectional view of a terminal portion of a light-conducting cable provided with a fitting according to the invention;

FIG. 1a is an axial sectional view of the inner annular element or sleeve of the fitting of FIG. 1 in its unstressed state; and FIG. 2 is a side-elevational view, partly in section, of a branched light-conducting cable embodying the invention.

The cable partly shown in FIG. 1 comprises a strand of light-conducting filaments 1 enveloped by a protective sheath 7 of flexible material (e.g., rubber). A resilient sleeve 2, shown in FIG. 1a in its natural relaxed state, has been slipped over a terminal portion of bundle 1 so as to hold the strands together, an extremity 3 of the bundle projecting beyond the right-hand end of sleeve 2 which, as seen in FIG. 1a, represents the narrower end of its inherent frustoconical shape. Sleeve 2 may be made of a cold-setting elastomer, e.g., silicone rubber, or of heat-vulcanized natural or synthetic rubber. The axial extent of the projecting cable end 3 may be on the order of 1 mm.

Sleeve 2 and end 3 are further surrounded by an outer annular element in the form of a rigid nipple 4, e.g., of metal or plastic material, which has a substantially cylindrical wall portion 6 in the region of sleeve 2 and terminates in a constricted portion 5 contacting the cable end 3. An adhesive 14, such as the aforementioned epoxy resin known as Araldite, occupies the small clearance between elements 2 and 4 to secure the latter to the cable end 3 while also permeating the spaces between the strands at that end. Nipple 4 is slightly tapered externally, e.g., at a rate of 1:20, for easy insertion into a complementary female connector 20 forming a plug-and-jack connection therewith; connector 20 may in turn be coupled to a similar cable or to some other extension of the optical circuits. It will be noted that the rearwardly converging transition surface between portions 5 and 6 of nipple 4 forms an abutment for the sleeve 2.

Nipple 4 is shown provided at its forward end, opposite the constriction 5, with an enlarged head portion 12 here illustrated as a separate ring fitted onto the outer periphery of portion 6. Sheath 7 has been drawn over the head 12 which, for extended contact with the sheath, has a deformed outer surface of corrugated shape. A tie wire 19 is shown looped around the expanded end of sheath 7 to help fasten it to the nipple head 12; for the same purpose there is also provided a ring 13 which clamps this end of the sheath between itself and the head 12. Some of the adhesive mass 14 may likewise also be used, as indicated, to help complete the connection. It will be apparent that sleeve 2 exerts a strongly contractile force upon the fibers or strands of bundle 1, especially at the end 3, so that they will be effectively combined into a rigid unit and will not be damaged by any flexural or other stresses exerted upon the remainder of the bundle.

The sheath 7 could also be clamped between the nipple 4 and the sleeve 2, as illustrated in FIG. 2 with reference to similar two-part fittings described hereinafter.

FIG. 2 shows another part of the cable 1 and its sheath 7, elements 4 and 13 of the fittings shown in FIG. 1 being seen on the left-hand end of the assembly of FIG. 2. At a separation point S the bundle of filaments 1 splits into several branches 1a, 1b, 1c each with its individual protective sheath 7a, 7b, 7c. The free ends of these branches are shown provided with terminations again similar to the one of FIG. 1 of which the elements 13a, 13b, 13c and 4a, 4b, 4c are visible.

Immediately to the left of separation point S, thus in the terminal region of sheath 7, the bundle 1 is surrounded by an inner annular element 10 and an outer annular element 11; element 10 is again advantageously constituted by a resilient sleeve (not necessarily conical) whereas element 11 is a rigid bushing of cylindrical shape. Sheath 7 is clamped between elements 10 and 11 and, at a location beyond bushing 11, between sleeve 10 and an outer shell 9 which extends past the point S to surround part of the branch sheath 7a, 7b, 7c. Each of these branch sheaths is in turn gripped between a respective bushing 15a, 15b, 15c and an associated inner sleeve 16 (as shown for the branch 1a) which again resiliently embraces the respective bundle of filaments 1a, 1b, 1c. The bushings 15a, 15b, 15c are extended rearwardly into the shell 9 at 17 and are cemented thereto by an adhesive 18 which may be of the same type as the bonding agent 14 described in connection with FIG. 1. Such an adhesive is also provided at the left-hand end of the sleeve, as indicated at 18′, to bond the shell 9 to the bushing 11. Shell 9 may further be cemented directly to the fibers 1, 1a, 1b, 1c as indicated at 18″; as before, the adhesive may permeate the spaces between the fibers to bond them to one another. Thus, there is again created a compact unit which firmly holds the strands together and secures them against rupture even if the bundles 1, 1a, 1b, 1c are severely bent or twisted at locations beyond the shell 9.

I claim:

1. A light-conducting cable comprising a bundle of strands of light-transmissive material, a resilient sleeve embracing under stress a terminal portion of said bundle while leaving an extremity of said portion projecting from an end of said sleeve, and a rigid nipple embracing said sleeve and projecting therebeyond into contact with said extremity, said sleeve in its unstressed state converging toward said end thereof, said nipple having a substantially cylindrical part surrounding said sleeve and a constricted part adhesively secured to said extremity.

2. A cable as defined in claim 1 wherein said nipple has a slightly tapered outer surface permitting engagement with a complementary female connector.

3. A light-conducting cable comprising a bundle of strands of light-transmissive material, a flexible sheath enveloping said strands, a resilient sleeve embracing under stress a terminal portion of said bundle while leaving an extremity of said portion projecting from an end of said sleeve, and a rigid nipple embracing said sleeve and projecting therebeyond into adhesive contact with said extremity, said sleeve in its unstressed state converging toward said end thereof, said nipple having an enlarged head remote from said extremity embraced by said sheath.

4. A cable as defined in claim 3 wherein said head is externally deformed for extended surface contact with said sheath.

5. A cable as defined in claim 3 wherein said sheath extends past said head around said nipple, the latter being provided with a clamping ring beyond said head engaging an end of said sheath.

6. A cable as defined in claim 3 wherein said sheath is clamped between said nipple and said sleeve.

References Cited

UNITED STATES PATENTS

| | | | |
|---|---|---|---|
| 3,198,059 | 8/1965 | Phaneuf et al. | 350—96 |
| 3,215,029 | 11/1965 | Woodcock | 350—96 |
| 3,261,349 | 7/1966 | Wallace | 350—96 X |
| 3,278,739 | 10/1966 | Royka et al. | 350—96 X |

JOHN K. CORBIN, Primary Examiner